UNITED STATES PATENT OFFICE.

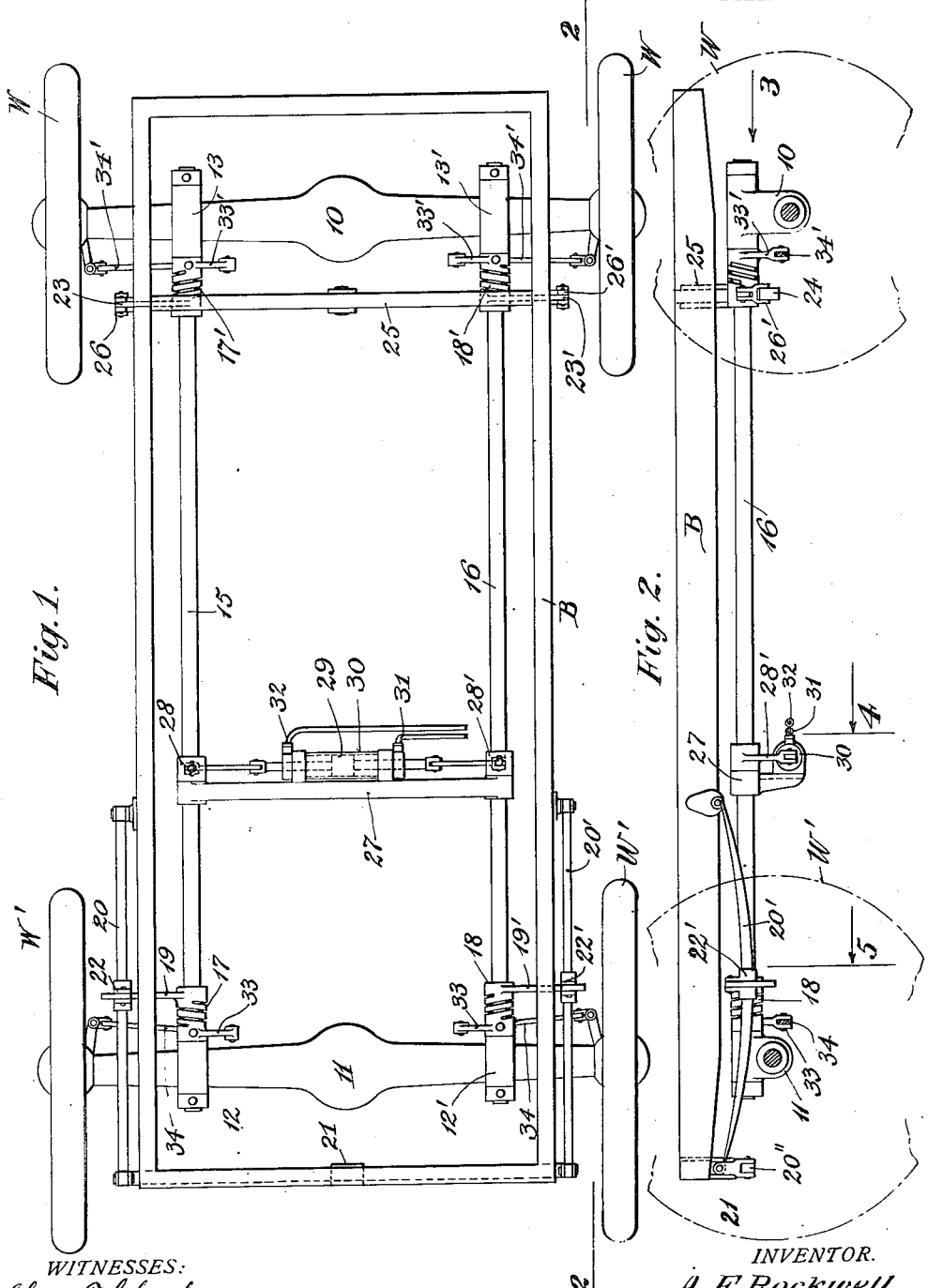

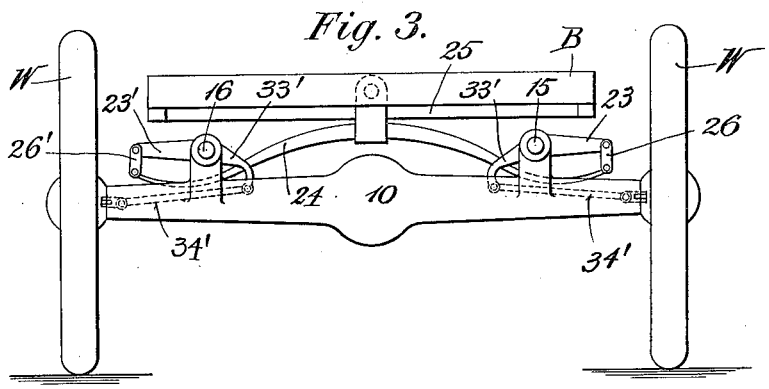
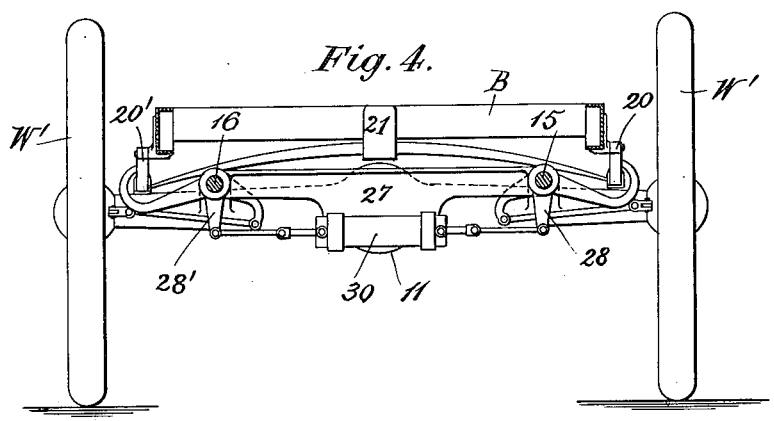
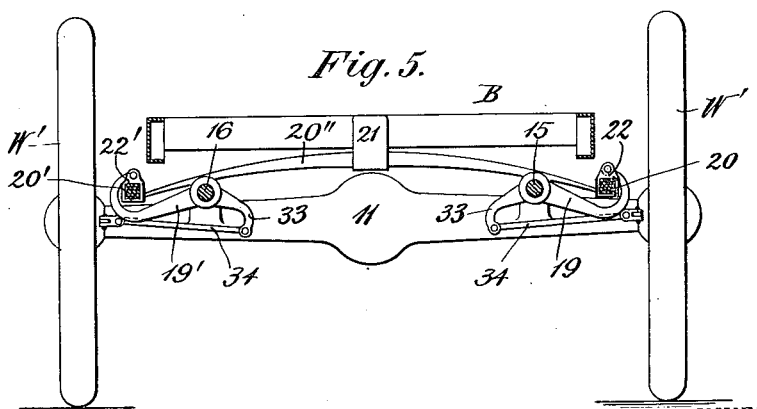

ALBERT F. ROCKWELL, OF BRISTOL, CONNECTICUT, ASSIGNOR TO THE NEW DEPARTURE MANUFACTURING COMPANY, OF BRISTOL, CONNECTICUT, A CORPORATION OF CONNECTICUT.

VEHICLE.

962,258.  Specification of Letters Patent.  Patented June 21, 1910.

Application filed March 30, 1906, Serial No. 308,891. Renewed January 4, 1909. Serial No. 470,598.

*To all whom it may concern:*

Be it known that I, ALBERT F. ROCKWELL, a citizen of the United States, residing at Bristol, county of Hartford, State of Connecticut, have invented a certain new and useful Vehicle, of which the following is a full, clear, and exact description, such as will enable others skilled in the art to which it appertains to make and use the same, reference being had to the accompanying drawings, forming part of this specification.

This invention relates to vehicles, but more particularly to means for connecting the body or its frame to a running gear.
One of the objects of the invention is to provide means whereby the vehicle body will be tilted or inclined proportionally to the angle of deflection of the wheels from the longitudinal center of the running-gear frame. In other words, one of the objects of my invention is to provide means for tilting the body during the time that the wheels of the vehicle are scribing an arc, so that the usual tendency to shift the load carried by the body will be resisted. This shifting of the load is very noticeable when sharp turns are made, the tendency being to throw the occupants of the vehicle from the inner side to the outer side of the vehicle. By tilting the body so that the outer portion thereof will be in a plane higher than the plane of the inner side this objectionable condition will be overcome, causing the occupants to experience but little annoyance, if indeed any at all, when the wheels are scribing an arc.

It is also the purpose of my invention to provide means whereby the body will be resiliently supported by the running-gear frame to afford ease for the occupants of the vehicle, and the construction and arrangement of the parts of my invention are such that the body will be resiliently supported irrespective of the angle of inclination thereof.

Another object of my invention is to provide a construction of support for the body whereby the body will be positively tilted every time the wheels are deflected, and just as positively returned to an approximately horizontal plane when the wheels are brought back to their natural positions whereby the vehicle may continue to travel in a straight path.
In order to clearly illustrate an embodiment of my invention, I have eliminated the engine, driving mechanism and other accessories which usually accompany a motor vehicle, because these parts are well known and are unnecessary to a clear understanding of my invention.

In the drawings: Figure 1 is a plan view of a vehicle running gear constructed in accordance with my invention; Fig. 2 is a view on the line 2—2 of Fig. 1; Fig. 3 is a front end view of a vehicle embodying my invention; Fig. 4 is a sectional view on the line 4—4 of Fig. 2, looking in the direction of the arrow; and Fig. 5 is a sectional view on the line 5—5 of Fig. 2, looking in the direction of the arrow.

In the form of invention illustrated in the drawings, I have shown the running gear frame as comprising the axle casings or trees 10 and 11, these trees being provided with bearings 12 and 12' and 13 and 13', in which are mounted rockable elements illustrated as rock shafts 16 and 15, and which comprise the side bars of the running frame. The body is resiliently supported by the runing gear frame, and a simple and efficient form of so supporting the body may include the torsional springs 17, 17' on the shaft 15, and those designated by the numerals 18, 18' on the shaft 16. The torsional springs 17 and 18 have portions fixed to the shafts 15 and 16 and terminate in outstanding arms 19 and 19' respectively. These outstanding arms are connected to a leaf spring construction engaging the body frame B at three points. The leaf spring construction is illustrated as comprising the two leaf spring members 20 and 20' having their rear ends connected by a bowed leaf spring 20'', which in turn is connected to the body at 21. The arms 19 and 19' are suitably curved to support the shackles 22 and 22' which engage the intermediate portions of the springs 20 and 20'. The outstanding arms 23 and 23' carried by the springs 17' and 18' support the body at its front end through the medium of a leaf spring 24 connected intermediate its ends to the transverse bar 25 carried by the body frame B. The links 26 and 26' illustrated in Fig. 3 constitute a practical form of connection between the arms 23 and 23' and the spring 24, but any well known connection may be employed instead.

The reference numeral 27 designates a tie-bar connecting the two rods or shafts 15 and 16 intermediate their ends, so as to prevent spreading thereof. Adjacent to this tie-bar 27 are illustrated depending arms 28 and 28' rigid with the shafts 15 and 16 and connected to a transversely reciprocatory piston 29 in a cylinder 30 carried by the tie-bar 27 and having pipes 31 and 32 on the respective sides of said piston to admit fluid pressure whereby said piston may be moved either to the right or to the left, it being understood that when pressure is admitted through the pipe 31, the pipe 32 becomes exhaust, and when pressure is admitted through pipe 32 the pipe 31 becomes exhaust. The inwardly projecting arms 33 33' near the respective ends of the rock shafts 15 and 16 are connected to portions of the wheels W and W' through the medium of links 34 and 34'. The arms 33 and 33' are substantially rigid with the shafts 15 and 16, and in actual practice they may be conveniently formed on the rigid portions of the torsional springs for convenience in assembling, but this combination will not be essential to the utility of the invention.

It will be observed that the connections between the front wheels and the set of arms designated by the numeral 33' are in rear of the front axle, while the connection between the arms 33 and the wheels W' are in front of the rear axle, thus causing the wheels to be inclined or deflected in slightly opposite directions to insure the movement of the vehicle in a proper arc when it is desired to turn out of a straight path.

Assuming that all of the parts are properly assembled, and that it is desired to turn the vehicle from right to left as the vehicle stands in Fig. 1, a suitable fluid under pressure would be introduced into the cylinder 30 through the pipe 32, so as to move the piston 29 from left to right. The movement of the piston from left to right will be effective in rocking the rock shafts 15 and 16, and consequently the arms 33 and 33', thus imparting movement to the rear portion of the wheels W' from right to left. At the same time the front portions of the wheels W will be deflected from right to left. Upon the extent to which the deflection is given to the wheels, will depend the angle of inclination of the body frame, because the relative movements of the arms 19, 19', 23, 23', 33, 33' will all be the same. The movements to rock the shafts 15 and 16, which will be effective in deflecting the wheels into positions to turn the vehicle from right to left as just explained, will be effective in raising the arms 19' and 23' and depressing the arms 19 and 23. Thus the outer side of the frame will be raised in proportion to the angle of deflection of the wheels. If the pressure be introduced into the cylinder 30 through the pipe 31, so as to shift the piston 29 from right to left, as the vehicle stands in Fig. 1, the wheels would be deflected to move the vehicle toward the right and cause the arms 19 and 23 to be raised, while the arms 19' and 23' would be lowered. In this latter case the left hand side of the vehicle frame would be raised, while the right hand side would be lowered. Thus it will be seen that in each instance the floor and seats of the body will be inclined in an upward direction toward the greatest arc of the circle, thereby resisting any tendency of shifting of the load, and thereby adding materially to the comfort of the occupants of the vehicle equipped with my invention. The peculiar arrangement of the mechanism heretofore described is such that the body will be efficiently cushioned irrespective of its angle of inclination, because the arms 19, 19' and 23, 23' have resilient connections between the body and the running gear frame to constitute spring supports for said body. By the peculiar organization heretofore described, the side bars or rock shafts 15 and 16 are enabled to carry the entire mechanism for tilting and supporting the body, an exceedingly simple and effective construction, but this construction may be varied to suit particular cases without departing from the spirit of the invention or sacrificing any of its advantages.

Attention is directed to the fact that by changing the angle of inclination of the body with respect to the running-gear frame, the center of gravity will be shifted toward the inner side, thereby reducing the liability of the vehicle to overturn or upset when the wheels are deflected. This shifting of the center of gravity toward the lowest point of the body will be in proportion to the angle of inclination of the body with respect to its supporting base.

It is to be understood, of course, that the wheels are so connected to the axles that they will have swinging movements on approximately vertical axes when it is desired to deflect them, but this construction is so common as applied to motor vehicles now on the market, that I have deemed it unnecessary to illustrate a specific form.

The structure for suspending the body from the rock shaft is not herein claimed *per se*, as that is included in the subject-matter of my copending application Serial Number 306,836.

What I claim is:

1. The combination with a base frame and a body frame, of rockable elements carried by the base frame, spring arms carried by said rockable elements and connected to the body frame, wheels carried by the base frame, rigid members carried by the rockable elements and connected to the wheels, and means for rocking said rockable elements.

2. The combination with a base and wheels therefor, of rockable elements carried by said base and connected to the wheels, a leaf spring structure carried by the body frame at one end thereof and connected to the rockable elements, and a leaf spring connection at the other end of the body frame and having connection to said rockable elements, and means for imparting movement to said rockable elements.

3. The combination with a base frame comprising axle supports and longitudinally disposed rockable side bars, of torsional springs carried by said rockable side bars and connected to the body frame, and connections between the wheels and the rockable side bars, whereby any movements of said bars will be synchronously communicated to the wheels and the body frame.

In testimony whereof, I hereunto affix my signature, in the presence of two witnesses.

ALBERT F. ROCKWELL.

Witnesses:
 B. F. FUNK,
 ETHEL L. TOLAN.